United States Patent [19]

Okuno et al.

[11] Patent Number: 4,946,807

[45] Date of Patent: Aug. 7, 1990

[54] COMPOSITE CERAMIC MATERIAL REINFORCED WITH SILICON CARBIDE WHISKERS

[75] Inventors: Akiyasu Okuno, Kani; Masakazu Watanabe, Nagoya, both of Japan

[73] Assignee: NGK Spark Plug Co., Ltd., Aichi, Japan

[21] Appl. No.: 86,455

[22] Filed: Aug. 18, 1987

[30] Foreign Application Priority Data

| Aug. 18, 1986 | [JP] | Japan | 61-191585 |
| Oct. 2, 1986 | [JP] | Japan | 61-233230 |
| Dec. 9, 1986 | [JP] | Japan | 61-291633 |
| Jun. 25, 1987 | [JP] | Japan | 62-156633 |

[51] Int. Cl.$^5$ .............. C04B 35/56; C04B 35/48; C04B 35/58
[52] U.S. Cl. .............. 501/89; 501/92; 501/95
[58] Field of Search .............. 501/88, 89, 92, 97, 501/95

[56] References Cited

U.S. PATENT DOCUMENTS

| 3,890,250 | 6/1975 | Richerson | 501/97 |
| 3,989,782 | 11/1976 | Lumby et al. | 501/97 |
| 3,991,148 | 11/1976 | Lumby et al. | 501/97 |
| 4,127,416 | 11/1978 | Lumby et al. | 501/98 |
| 4,327,187 | 4/1982 | Komatsu et al. | 501/97 |
| 4,341,965 | 7/1982 | Okuo et al. | 310/11 |
| 4,399,231 | 8/1983 | Prewo et al. | 501/95 |
| 4,506,020 | 3/1985 | Butler et al. | 501/97 |
| 4,507,224 | 3/1985 | Toibana et al. | 561/88 |
| 4,547,470 | 10/1985 | Tanase et al. | 501/97 |
| 4,554,197 | 11/1985 | Chyung et al. | 428/113 |
| 4,563,933 | 1/1986 | Yeckley et al. | 501/97 |
| 4,585,500 | 4/1986 | Minjolle et al. | 156/89 |
| 4,594,106 | 6/1986 | Tanaka et al. | 106/1.12 |
| 4,615,990 | 10/1986 | Richon et al. | 501/97 |
| 4,673,658 | 6/1987 | Gadkaree et al. | 501/89 |
| 4,767,727 | 8/1988 | Claussen et al. | 501/89 |

FOREIGN PATENT DOCUMENTS

| 8605480 | 3/1986 | PCT Int'l Appl. |
| 2157282 | 4/1985 | United Kingdom |

OTHER PUBLICATIONS

American Ceramic Society Bulletin 66 [2], pp. 347–352 (1987).

*Primary Examiner*—Mark L. Bell
*Assistant Examiner*—David M. Brunsman
*Attorney, Agent, or Firm*—Wegner & Bretschneider

[57] ABSTRACT

A composite ceramic material reinforced with silicon carbide whiskers consists essentially of 5 to 45% by weight of SiC whiskers, 3 to 20% by weight of at least one selected from the group consisting of oxides and oxynitrides of zirconium calculated on zirconium, and the balance being a SiZlON-based ceramic substance. The SiAlON-based ceramic substance consists essentially of a substance selected from the group consisting of β-SiAlON represented by a compositional formula of $Si_{6-z}Al_zO_zN_{8-z}$ (where $0 < z \leq 1$) and an α,β-composite SiAlON made up of said β-SiAlON and an α-SiAlON of the formula $M_x(Si,Al)_{12}(O,N)_{16}$, where M denotes at least one selected from the group consisting of Li, Ca, Mg, Y and rare earth metals and $0 < x \leq 2$; and 1 to 25% by weight of a glass phase containing therein Zr, Si, Al, O and N, or further at least one selected from the group consisting of Y, Mg, Ca and rare earth metals. This composite material has high strength and toughness suitable for articles requiring high wear and heat resistance such as cutting tools or ceramic valves for internal combustion engines.

23 Claims, No Drawings

COMPOSITE CERAMIC MATERIAL REINFORCED WITH SILICON CARBIDE WHISKERS

BACKGROUND

This invention relates to a silicon nitride type composite ceramic material reinforced with use of silicon carbide whiskers. More particularly, it is concerned with a composite ceramic material which is widely useful as a material for cutting tools capable of performing high speed cutting of high nickel, cast ion, steel, aluminum, titanium, and generally those materials having difficulty in cutting, or structural members or parts for automobile engines such as ceramic valves, etc., or other members required to have wear-resistance, corrosion-resistance and heat-resistance.

The silicon nitride ($Si_3N_4$) type ceramic containing silicon nitride as the principal component is excellent in its mechanical strength, oxidation-resistance, wear-resistance, thermal-shock-resistance, corrosion-resistance, and others. Thus there has already started practical use thereof as structural materials for the engines and materials for the cutting tools.

However, in spite of such excellent characteristics, it is poor in its qualitative stability and homogenity, when compared with those of metals, hence much higher toughness has been desired of the silicon nitride ceramics from the standpoint of improvements in its working reliability as well as high mechanical properties. For this purpose, there have been made many attempts to produce composite bodies of silicon nitride ceramics, in which silicon carbide (SiC) whisker is sued as the reinforcing material, as disclosed in Japanese Patent Kokoku-Publication Nos., 58-51911, 60-35316, and 60-55469; Japanese Patent Kokai-Publication Nos. 59-102862, 60-200863, 60-246268, 61-291463, and so forth. Even these attempts, however, have not yet reached their level of sufficient practicability, and there is much to be desired in improvement in its toughness.

In addition, the composite material of silicon nitride which exhibits difficulty in its sintering property, because of the anisotropy of SiC whiskers, could be obtained only by the pressure sintering, but could not be obtained by the normal pressure sintering and the gas pressure sintering (in a pressurized gas atmosphere at 10 atms. or below). Thus the productivity upon manufacturing such composite materials has not been satisfactory.

SUMMARY OF THE DISCLOSURE

In view of the abovementioned factual situations, it is a primary object of the present invention to provide a ceramic composite material rein forced with silicon carbide whiskers, which has its excellent characteristics such as toughness and working reliability such that have not been obtainable by the conventional methods.

It is another object of the present invention to provide such a ceramic composite material which can be produced by the normal pressure sintering and the gas pressure sintering.

According to the present invention, such silicon carbide whisker-reinforced composite material having excellent characteristics can be obtained by uniformly dispersing the SiC whiskers and oxides and/or on oxynitrides of zirconium into a SIALON-based ceramic sintered body (or substance), which is particularly stable in its oxidation-resistant property and has a low reactivity with metals, among those silicon nitride type ceramics, to thereby prepare a composite ceramic body.

The present inventors have made various studies and researches for attaining the abovementioned object, as the result of which they have found out that the oxides and/or the oxynitrides of zirconium are capable of improving the toughness of the silicon nitride ceramics and makes it possible to produce such ceramics by the normal pressure sintering or the gas pressure sintering, and that it is preferable to use the SIALON-based ceramics having a certain particular composition, and that a glass phase formed without or by the sintering aids and the like is effective.

According to a first aspect of the present invention, in general aspect thereof, there is provided a composite ceramic material reinforced with silicon carbide whiskers, which consists essentially of:

5 to 45% by weight of SiC whiskers, 3 to 20% by weight of at least one selected from the group consisting of oxides and oxynitrides of zirconium calculated on zirconium, and the balance being SIALON-based ceramic substance, said SIALON-based ceramic substance consisting essentially of one selected from the group consisting of β-SIALON represented by a compositional formula of $Si_{6-z}Al_zO_zN_{8-z}$ (where: $0 < z \leq 1$) and an α,β-composite SIALON made up of said β-SIALON and an α-SIALON represented by a compositional formula of $M_x(Si,Al)_{12}(O,N)_{16}$ (where: M denotes at least one selected from the group consisting of Li, Ca, Mg, Y and rare earth metals; and $0 < x \leq 2$); and 1 to 25% by weight of a glass phase containing therein Zr, Si, Al, O and N, or further at least one selected from the group consisting of Y, Mg, Ca and rare earth metals. The formulae are based on atomic fraction.

The abovementioned α-SIALON is crystallographically a solid-solution wherein a Si-site in α-$Si_3N_4$ thereof is substituted with Al, and an N-site thereof is substituted with O, and other elements may be incorporated into crystal lattices to form an interstitial solid-solution. Examples of such elements forming the interstitial solid-solution are Li, Ca, Mg, Y and rare earth metals. The glass phase may contain also unavoidable impurities.

According to a second aspect of the present invention there is provided a composite ceramic material reinforced with silicon carbide whiskers, which has been produced by sintering a starting material mixture consisting essentially of:

5 to 45% by weight of SiC whiskers, 3 to 20% by weight of zirconia calculated on zirconium, and the balance being SIALON-forming components, said SIALON-forming components consisting essentially of $Si_3N_4$ and $Al_2O_3$ in a proportion corresponding to β-SIALON represented by a compositional formula of $Si_{6-z}Al_zO_zN_{8-z}$ (where: $0 < z \leq 1$).

The SIALON-forming components may further comprise at least one of $SiO_2$ and AlN, $SiO_2$ being no more than 10% and AlN being no more than 15%, by weight of the entire mixture.

Further the SIALON-forming components may have a proportion corresponding to an α,β-composite SIALON made up of said β-SIALON and an α-SIALON represented by a compositional formula of $M_x(Si,Al)_{12}(O,N)_{16}$ (where: M denotes at least one selected from the group consisting of Li, Ca, Mg, Y and rare earth metals; and $0 < x \leq 2$); said M being present as oxide(s) thereof in the SIALON-forming components.

Preferably $Si_3N_4$ amounts to 49–90% by weight of the entire mixture, and $Al_2O_3$ amounts to 1.5–25% by weight of the entire mixture.

The SIALON-forming components further may include at least one glass phase-forming component of no more than 15% (preferably 1% or more) by weight, of the entire mixture, selected from the group consisting of oxides of Mg, Ca, Y and rare earth metals.

The starting material mixture is first weighed and mixed homogeneously, e.g., by milling to provide a uniform distribution of SiC whisker, then compacted followed by sintering at a temperature ranging from 1650° to 2000° C., in an inert atmosphere ($N_2$, Ar, $N_2$+Ar etc.) of a normal pressure or a pressurized gas for a period of time until a desired density of at least 95% relative to the theoretical density is achieved (e.g., for about 30–240 minutes) resulting in the composite ceramic material.

The foregoing object, other objects as well as particular functions of the constituent components for the composite body of the silicon nitride type ceramic reinforced with silicon carbide whiskers according to the present invention will become more apparent and understandable from the following detailed description thereof, when read in conjunction with several preferred examples thereof.

DETAILED DESCRIPTION OF PREFERRED EMBODIMENTS

The SiC whiskers to be used in the present invention has in itself high hardness and mechanical strength in a wide temperature range from a normal temperature to an elevated temperature, and retains the state and form of whisker even after the sintering uniformly dispersed within the structure, thereby contributing to improvement in the high temperature strength of the ceramic composite material, and increase in the fracture toughness and the hardness thereof.

As the whiskers for such purpose, there may be preferably be used one, from the standpoint of obtaining a densified body having high toughness, crystal whiskers having an average diameter of from 0.2 to 5 μm (more preferably 0.5 to 2 μm), an average length of from 5 to 100 μm (more preferably 5 to 50 μm) and an aspect ratio of from 5 to 500 (more preferably 5 to 100), which may contain therein 1.0% by weight or below of cationic impurities such as Al, Ca, Mg, Ni, Fe, Mn, Co, Cr, etc. and silicon dioxide ($SiO_2$), and which have less buckling, branching, surface defects, and so forth.

The reason for setting the content of the SiC whisker in the range from 5 to 45% by weight is as follows. When it is less than 5% by weight, the improvement in the toughness of the ceramic material is insufficient. On the contrary, when the content exceeds 45% by weight, homogeneous dispersion and sintering property of the material become lowered due to the anisotropy of the whisker. For this reason, the abovementioned range from 5 to 45% by weight is set, and a preferred range is from 10 to 30% by weight, and an optimum range is from 15 to 25% by weight.

The oxides and/or oxynitrides of zirconium function in the following manner. On the one hand, they enable the silicon nitride type ceramics to be produced by the normal pressure sintering or the gas pressure sintering; on the other hand, zirconium which has been converted from a part of oxide and/or oxynitride of Zr into solid-solution of the glass phase at the time of the sintering improves the wettability between the glass phase and the SiC whiskers at their interface to make it possible to secure stronger bonding between them. In this way, the oxides and/or oxynitrides of zirconium function to enable the inherent characteristics of the SiC whisker to be satisfactorily exhibited, thereby improving the toughness of the composite ceramic material.

There is no particular limitation to the oxides and oxynitrides of zirconium to be used. Any of such oxides and oxynitrides of zirconium such as, for example, $ZrO_2$ (monoclinic, tetragonal, cubic crystals, or mixtures thereof) and those which coincide fairly well in the results of their X-ray diffraction with ZrO defined in ASTM Card No. 20-684.

While a part of the entire zirconium remains in the glass phase as solid-solution after the sintering, most part of zirconium re-precipitates from the glass phase into a crystal phase depending upon the respective blended mixture composition, and is present in the sintered body in the form of the abovementioned oxides and/or oxynitrides of zirconium.

As the consequence of this, even if zirconium is present in the sintered body in the form of $ZrO_2$, it is still able to exist, depending on the blended mixture composition, as the monoclinic, tetragonal, or cubic crystal, or mixtures of these crystals. And, even if there exist in the sintered body various crystals belonging to different crystallographic systems, the resulting sintered body is also able to have high mechanical strength and high toughness, because the function and effect of zirconium in the sintering procedure is the same.

The reason for setting the content of the oxide of and/or oxynitride of zirconium in a range of from 3 to 20% by weight in terms of the content of zirconium is as follows. With its content being below 3% by weight, the effect of improvement in the toughness is not sufficient, and the sintering at a normal pressure and pressurized gas pressure is insufficient. On the contrary, with its content exceeding 20% by weight, the resulting sintered body unfavorably loses its hardness, heat-conductivity, toughness and oxidation-resistant property. Calculated on zirconium, this content is preferably 7 to 20% by weight, and more preferably 7 to 15% by weight.

The SIALON-based ceramic substance is a solid-solution of ceramics composed mainly of $Si_3N_4$ and $Al_2O_3$, or further AlN and/or $SiO_2$. In the present invention, it encompasses β-SIALON represented by a compositional formula of $Si_{6-z}Al_zO_zN_{8-z}$ (where: $0 < z \leq 1$) and α-SIALON represented by a compositional formula of $M_x(Si,Al)_{12}(O,N)_{16}$ (where: $0 < x \leq 2$), in which metals are present in the crystal lattices in the form of the interstitial solid-solution.

In general, the β-SIALON possesses high toughness, but low hardness, while α-SIALON has a relatively low toughness, but high hardness.

The SIALON-based ceramic for use in the present invention is principally composed of β-SIALON, or a mixture of such β-SIALON and the α-SIALON. While there is no particular limitation to the mixing ratio between α-SIALON and β-SIALON, it is preferable that, when a compsite ceramic material of high hardness and high toughness is required, a ratio of α-SIALON in the entire SIALON is in a range from 5 to 30% (more preferably from 5 to 20%.)

The reason for setting the value of 'z' in the compositional formula of the β-SIALON as specified for use in the present invention, to be $0<z\leq 1$ resides in that, when z is greater than 1 ($z>1$), the mechanical strength and the toughness of the ceramic sintered body become lowered with the consequent inability to satisfy the mechanical characteristics thereof required as the materials for various high temperature structural members and cutting tools. The "z" value is preferably $0<z\leq 0.5$.

Also, the reason for setting the value of 'x' in the compositional formula of the $\alpha$-SIALON to be $0<x\leq 2$ resides in that any SIALON having this value of 'x' stands for the $\alpha$-SIALON which can be obtained usually.

The SIALON-based ceramic substance preferably amounts to at least 55% of the entire ceramic material.

Now, as for the glass phase containing therein Zr, Si, Al, O and N (or further unavoidable impurities), or further one or more of added Y, Mg, Ca and rare earth metals as the glass phase-forming components, the glass phase is present in the abovementioned SIALON-based ceramic at a rate of from 1 to 25% by weight. If this glass phase is less than 1% by weight, there can be obtained no sintered body of a desired density (e.g., at least 95% relative to the theoretical density), because the SIALON cannot be sintered sufficiently; on the other hand, if it is greater than 25% by weight, there is brought about deterioration in toughness and high temperature mechanical strength of the ceramic sintered body, which causes unfavorable effect to the high temperature material and the material for cutting tools. Preferred amount of the glass phase may be understood based on the preferred embodiments by analysing the phase structure thereof.

In some cases, the ceramic sintered body according to the present invention would inevitably contain threin, depending on purity of the $Si_3N_4$ powder to be used as the starting material and blending ratio of the starting materials, those compounds which are produced in a very small quantity, such as $Si_2N_2O$, $Si_2ON_2$, $Y_2O_3 \cdot Si_3N_4$, $3Y_2O_3 \cdot 5Al_2O_3$, $10Y_2O_3 \cdot 9SiO_2 \cdot Si_3N_4$, $4Y_2O_3 \cdot SiO_2 \cdot Si_3N_4$, $YSiO_2N$, $Mg_2SiO_4$, $MgSiN_2$, and so forth. These compounds may be present in the sintered body in a range which does not give mal-effect to the characteristics thereof.

Furthermore, the addition of the glass phase forming components as mentioned in the preceding is particularly effective for the purpose of adopting the normal pressure sintering process and the pressurized gas sintering process. Preferably, the sintering may be conducted at a temperature ranging from 1750° to 1800° C.

With a view to enabling those persons skilled in the art to put the present invention into practice, the following preferred examples are presented. It should however be noted that the invention is not limited to these examples alone, but any changes and modifications in the ingredients and the sintering conditions may be made without departing from the spirit and scope of the present invention as recited in the appended claims.

EXAMPLE 1

To $Si_3N_4$ powder having an $\alpha$-ratio of 90% and an average particle diameter of 0.6 $\mu$m, there were added $\alpha$-$Al_2O_3$ powder having an average particle diameter of 1 $\mu$m, SiC whiskers having an average length of about 20–30 $\mu$m ("SC-9"—a product of ARCO Chemical Co.) and monoclinic $ZrO_2$ having an average particle diameter of 0.3 $\mu$m, at their varying ratios as shown in Table 1 below. Then, these mixtures were respectively dispersed uniformly by wet-milling in ethanol for four hours, followed by drying and granulating the same, from which base powders with a resultant SiC whisker length of about 3–20 $\mu$m (average of about 10 $\mu$m) were obtained.

Subsequently, each of these base powders was subjected to the hot-press-sintering process in a graphite mold at a sintering temperature as shown in Table 1 and under a pressure of 200 kg/cm² for 60 minutes, thereby obtaining highly densified sintered bodies with densities relative to the theoretical density of at least 97%.

The thus obtained sintered bodies were subjected to polishing process to a dimension of 4 mm × 3 mm × 40 mm, after which it was measured for the bending strength in accordance with JIS-R1601, the Vickers hardness with a load of 30 kg, and the fracture toughness value by an indentation micro-fracture method. It was verified through X-ray diffractometry, chemical analyses and the quantitative analysis of carbon that, of the composition of the sintered body, both $ZrO_2$ and SiC whiskers remained almost in the same amount as their original blended mixture composition.

Also the 'z' value of the $\beta$-SIALON was determined based on the lattice parameters of the $\beta$-SIALON by means of the X-ray diffraction. The results obtained are as shown in Table 1 below.

Besides, Table 1 also indicates the results of evaluation of the cutting performance of the obtained sintered bodies, which had been polished into a tip (or insert) form standardized to "SNGN 432".

Cutting test was done in accordance with the undermentioned conditions. The surface of a work (block) having a surface of 200 mm × 50 mm was subjected to milling along its longitudinal direction until the edge of the cutting tip fractured, and the number of times of impacts applied to the tip was measured, the result being indicated in Table 1 by an average value for ten specimens.

| Cutting Conditions: | |
| --- | --- |
| Work | INCONEL 718 |
| Cutting speed | 200 mm/min. |
| Feed | 0.2 mm/tooth |
| Depth of cut | 1.5 mm |

From the measured results, it was found that the $\beta$-SIALON-based composite sintered body ($0<z\leq 1$), in which SiC whiskers and $ZrO_2$ are contained within the range of the present invention, was excellent in its toughness, and the fracture-resistant property of the cutting tools made of this sintered body was also significantly improved.

EXAMPLE 2

In the same manner as in Example 1 above, the base powders of the blending composition as shown in Table 2 below were obtained, with the exception that AlN having an average particle diameter of 0.5 $\mu$m and $Y_2O_3$, MgO, CaO, $Dy_2O_3$ and $CeO_2$ were added as glass-forming components other than Zr, Si, Al, O, N and unavoidable impurities. Thereafter, the mixture of the starting materials was subjected to the hot press sintering process at a temperature of 1,750° C. and under a pressure of 200 kg/cm² for 60 minutes, thereby obtaining densified sintered bodies. The thus sintered bodies were evaluated in the same manner as in Example 1 above, the results obtained being as shown in Table 2. The inventive sintered bodies showed a relative density of at least 98%.

From the results, it was found that the β-SIALON-based composite sintered body containing therein 1 to 25% by weight of a glass phase composed of Zr, Si, Al, O, N and unavoidable impurities, and one or more kinds of oxides of added Y, Mg, Ca and rare earth metals had excellent mechanical strength and toughness.

Further, it was found that the cutting tools made of this sintered body had an excellent fracture-resistant property (or anti-chipping property), which contributed to remarkable improvement in the service life and working reliability of the tools.

It was furthermore found, on the other hand, that the sintered body of silicon nitride ceramic which does not contain the aluminum compound as the SIALON-forming composition was inferior in its cutting performance to that of the SIALON-based ceramic sintered body according to the present invention.

EXAMPLE 3

In the same manner as in Examples 1 and 2 above, the base powders of varying mixing ratios as shown in Table 3 below were each sintered, after which each of them was identified with respect to the composition by means of the X-ray diffraction. The results of the test are as shown in the same Table 3. The relative density was at least 98%.

From the results shown in Table 3, it was found that $ZrO_2$ as added was present in the sintered body in the form of $ZrO_2$, or ZrO, or a certain zirconium compound which seemed to be the an oxynitride of zirconium, depending on the blending composition of the starting base powders. Even in the case of its existence as $ZrO_2$ in the sintered body, it could be present in the form of the monoclinic, tetragonal or cubic crystal, or mixtures of these crystals, depending on the blending composition of the starting base powders. In all these cases, it was found that the resulting sintered bodies had high mechanical strength and high toughness without exception.

In this example, it is also shown that use can be made of the SIALON-based composite sintered body, in which the α-SIALON was made coexistent with the β-SIALON.

EXAMPLE 4

In the same manner as in Example 1 above, the starting base powders were blended at various ratios as shown in Table 4 below, with the exception that coprecipitated $ZrO_2$ powder having an average particle diameter of 0.8 μm and containing therein $Y_2O_3$ was used in place of $ZrO_2$ to be added. Each of the resulted base powders was sintered in the same manner as in Example 2 above, and then the mechanical characteristics of the sintered body were evaluated. Table 4 also indicates the test results in the case of using $ZrO_2$ which does not contain at all $Y_2O_3$ solid-solution. The relative density was at least 98%.

From the test results, it was found that, despite change in the form of $ZrO_2$ to be added, the sintered body had also high mechanical strength and high toughness.

EXAMPLE 5

In the same manner as in Example 2 above, the starting materials were mixed at various ratios as shown in Table 5 below with the exception that use was made of β-SIALON having an average particle diameter of 0.8 μm, which was prepared in advance to have a desired value of 'z', as a starting material, in place of $Si_3N_4$ powder. The obtained base powder was sintered, and its mechanical properties were evaluated. The results are shown in Table 5 below, from which it was found that sintered bodies having high mechanical strength and high toughness could also be obtained, even in case of using the β-SIALON powder having the 'z' value of a range of $0 < z \leq 1$, as the starting material. The relative density was at least 95%.

EXAMPLE 6

The base powders having various blending ratios of the starting materials as shown in Table 6 below and prepared in the same manner as in Example 2 above, with the exception that use was made of various zirconium compounds having an average particle diameter of 2 μm or below, were each press-formed under a pressing pressure of 1.5 tons/cm² to a dimension of 50 mm in length, 50 mm in width and 7 mm in thickness, after which the shaped body (compact) was sintered for two hours at a temperature of 1,750° C. in a nitrogen gas atmosphere under a pressure of 1 atm., resulting in a primary sintered body. Subsequently, this primary sintered body was re-sintered for two hours at a temperature of 1,750° C. in a pressurized nitrogen gas atmosphere at a pressure of 70 atm, thereby obtaining a densified secondary sintered body. The thus obtained sintered body was evaluated in the same manner as in Example 1 above, the results of which are indicated in Table 6 below. The relative density was at least 95%.

From these test results, it was found that only those sintered bodies added with $ZrO_2$, having a composition within the range as defined by the present invention, and sintered by the normal pressure sintering process and the pressurized gas-sintering process had excellent mechanical properties.

Further, cutting tools were manufactured by use of the composite material according to the present invention, and then they were subjected to the cutting test in the same manner as in Example 1 above. The results are also shown in Table 6 below, from which it was found that the sintered bodies according to the present invention, when they were made into the cutting tools, exhibited increased number of times of impacts until the cutting edge fractured.

As it is apparent from the contents of the foregoing preferred examples of the present invention, the composite materials according to the present invention are excellent in their properties of the sintered body such as bending strength, fracture toughness, Vickers hardness, and so on, with the consequence that the materials are capable of being used in various ways such as the cutting tools, engine components for automobiles, wear-resistant members, corrosion-resistant members, heat-resistant members, and so forth.

TABLE 1

| | Samples | Mixture Composition (wt %) β-sialon forming composition Si₃N₄ | Al₂O₃ | ZrO₂ (calculated on Zr) | SiC whisker | Sintering Temp. (°C.) | z value | Properties of Sintered Bodies bending str. (kg/mm²) | fracture toughness (MN/m^{3/2}) | (kg/mm²) | impacts until fracture (times) |
|---|---|---|---|---|---|---|---|---|---|---|---|
| Inventive Examples | 1 | 58.6 | 5.3 | 14.8 | 21.3 | 1750 | 0.4 | 81.0 | 8.3 | 1840 | 4650 |
| | 2 | 83.1 | 8.1 | 3.7 | 5.1 | " | 0.5 | 82.1 | 6.5 | 1730 | 3160 |
| | 3 | 76.2 | 8.2 | 7.4 | 8.2 | " | " | 83.2 | 6.6 | 1750 | 3270 |
| | 4 | 69.2 | 5.3 | 14.8 | 10.7 | 1800 | 0.4 | 95.1 | 7.5 | 1770 | 4270 |
| | 5 | 68.0 | 5.2 | 11.1 | 15.7 | 1750 | " | 94.4 | 8.2 | 1800 | 4560 |
| | 6 | 65.2 | 5.4 | 18.5 | 10.9 | " | " | 82.5 | 7.0 | 1750 | 4050 |
| | 7 | 73.2 | 5.2 | 11.1 | 10.5 | " | " | 89.8 | 7.3 | 1790 | 4300 |
| | 8 | 64.8 | 7.2 | 7.4 | 20.6 | " | 0.5 | 91.2 | 7.8 | 1860 | 4575 |
| | 9 | 55.4 | 7.3 | 11.1 | 26.2 | 1800 | " | 83.1 | 7.4 | 1850 | 4660 |
| | 10 | 52.5 | 9.2 | 7.4 | 30.9 | " | 0.6 | 82.4 | 7.3 | 1880 | 4105 |
| | 11 | 45.6 | 10.1 | 3.7 | 40.6 | " | " | 80.0 | 6.5 | 1920 | 3060 |
| | 12 | 65.9 | 20.3 | 3.7 | 10.1 | 1750 | 1.0 | 76.5 | 6.1 | 1780 | 2925 |
| Comparison | 13 | 85.0 | 10.0 | 0 | 5.0 | 1800 | 0.6 | 51.0 | 4.8 | 1600 | immediately fractured |
| | 14 | 66.6 | 5.6 | 22.2 | 5.6 | " | 0.4 | 50.5 | 4.6 | 1400 | immediately fractured |
| | 15 | 91.2 | 5.1 | 3.7 | 0 | " | " | 48.3 | 4.8 | 1580 | immediately fractured |
| | 16 | 30.9 | 10.3 | 7.4 | 51.4 | " | 0.6 | 43.5 | — | — | immediately fractured |
| | 17 | 35.5 | 50.7 | 3.7 | 10.1 | " | 2.1 | 45.0 | 3.5 | 1450 | immediately fractured |
| | 18 | 90.0 | 10.0 | 0 | 0 | " | 0.6 | 35.0 | 3.5 | 1000 | immediately fractured |

TABLE 2

| | Samples | Mixture Composition (wt %) sialon-forming composition Si₃N₄ | Al₂O₃ | AlN | glass phase-forming components Y₂O₃ | MgO | CaO | Dy₂O₃ | CeO₂ | ZrO₂ (calculated on Zr) | SiC whisker | Properties of Sintered Bodies bending str. (kg/mm²) | fracture toughness (MN/m^{3/2}) | Hv (kg/mm²) | impacts until fracture (times) |
|---|---|---|---|---|---|---|---|---|---|---|---|---|---|---|---|
| Inventive Examples | 19 | 63.8 | 5.1 | 2.1 | 1.0 | | | | | 7.4 | 20.6 | 81.1 | 8.0 | 1720 | 4770 |
| | 20 | 43.4 | 4.3 | 8.1 | 8.1 | | | | | 14.8 | 21.3 | 110.5 | 8.0 | 1650 | >5000 |
| | 21 | 52.3 | 5.2 | | 10.5 | | | | | 11.1 | 20.9 | 105.5 | 10.5 | 1630 | >5000 |
| | 22 | 65.9 | 5.1 | | 15.2 | | | | | 3.7 | 10.1 | 75.1 | 6.5 | 1600 | 3270 |
| | 23 | 65.8 | 5.1 | 5.1 | | 5.1 | | | | 3.7 | 15.2 | 100.5 | 7.5 | 1650 | 4850 |
| | 24 | 61.8 | 5.1 | | | 5.1 | | | | 7.4 | 20.6 | 88.1 | 7.9 | 1630 | 4615 |
| | 25 | 62.9 | 4.1 | 5.1 | | | | 5.1 | | 7.4 | 15.4 | 95.5 | 7.4 | 1650 | 4550 |
| | 26 | 68.0 | 5.1 | | 3.1 | 1.0 | | | | 7.4 | 15.4 | 105.0 | 7.8 | 1660 | 4680 |
| | 27 | 72.0 | 5.1 | | | 3.0 | 1.0 | | | 3.7 | 15.2 | 103.1 | 7.5 | 1650 | 4200 |
| | 28 | 61.8 | 5.1 | | | | | | 5.1 | 7.4 | 20.6 | 95.0 | 7.8 | 1500 | 3900 |
| Comparison | 29 | 48.7 | 5.1 | 2.0 | 30.4 | | | | | 3.7 | 10.1 | 45.1 | 4.0 | 1430 | immediately fractured |
| | 30 | 53.8 | 5.1 | 2.0 | 10.1 | 10.1 | 5.1 | | | 3.7 | 10.1 | 40.3 | 3.8 | 1400 | immediately fractured |
| | 31 | 62.9 | | | | 5.1 | | | | 11.1 | 20.9 | 107.0 | 7.5 | 1560 | immediately fractured |
| | 32 | 59.9 | | | 8.1 | | | | | 11.1 | 20.9 | 103.0 | 7.1 | 1600 | immediately fractured |

N.B.: 31 and 32 represent silicon nitride ceramics.

TABLE 3

| | Samples | Mixture Composition (wt %) sialon-forming composition Si₃N₄ | Al₂O₃ | AlN | glass phase-forming components Y₂O₃ | MgO | CaO | Dy₂O₃ | CeO₂ | ZrO₂ (calculated on Zr) | SiC whisker |
|---|---|---|---|---|---|---|---|---|---|---|---|
| Inventive Examples | 33 | 62.8 | 5.2 | | | | | | | 11.1 | 20.9 |
| | 34 | 61.7 | " | | 1.1 | | | | | " | " |
| | 35 | 60.2 | " | | 2.6 | | | | | " | " |
| | 36 | 58.6 | " | | 4.2 | | | | | " | " |
| | 37 | 54.4 | " | | 8.4 | | | | | " | " |
| | 38 | 50.2 | " | | 12.6 | | | | | " | " |
| | 39 | 57.6 | " | | | 5.2 | | | | " | " |
| | 40 | " | " | | | | 5.2 | | | " | " |
| | 41 | " | " | | | | | 5.2 | | " | " |
| | 42 | " | " | | | | | | 5.2 | " | " |
| | 43 | 48.4 | 4.3 | 12.1 | 8.1 | | | | | 5.8 | 21.3 |
| | 44 | 51.7 | 2.1 | " | " | | | | | 5.1 | 20.9 |

Properties of Sintered Bodies

TABLE 3-continued

| Samples | | bending str. (kg/mm²) | fracture toughness (MN/m) | Composition | crystal structure of ZrO₂*¹ |
|---|---|---|---|---|---|
| Inventive | 33 | 94.5 | 7.5 | β-sialon, ZrO₂, ZrO, SiC, Si₂N₂O, Si₂ON₂*² | M>>T |
| Examples | 34 | 81.0 | 7.6 | β-sialon, ZrO₂, ZrO, SiC, Si₂N₂O, Si₂ON₂ | M<T |
| | 35 | 90.0 | 8.0 | β-sialon, ZrO₂, ZrO, SiC, — | T~C |
| | 36 | 104.0 | 8.3 | β-sialon, ZrO₂, ZrO, SiC, — | T<<C |
| | 37 | 105.5 | 9.5 | β-sialon, ZrO₂, ZrO, SiC, — | C |
| | 38 | 113.8 | 10.0 | β-sialon, ZrO₂, ZrO, SiC, — | C |
| | 39 | 105.5 | 7.9 | β-sialon, ZrO₂, ZrO, SiC, — | M<T |
| | 40 | 107.0 | 7.0 | β-sialon, —ZrO, SiC, — | — |
| | 41 | 95.0 | 8.0 | β-sialon, ZrO₂, ZrO, SiC, — | M<T |
| | 42 | 94.0 | 8.1 | β-sialon, ZrO₂, ZrO, SiC, — | M<T |
| | 43 | 110.5 | 8.0 | β-sialon, α- ZrO₂, ZrO, SiC, —sialon | T<<C |
| | 44 | 75.0 | 6.5 | β-sialon, α- ZrO₂, ZrO, SiC, — | C |

*¹M: monoclinic, T: tetragonal, C: cubic
*²(Zr-oxynitride)

TABLE 4

| | | Mixture Composition (wt %) | | | | | Properties of Sintered Bodies | | |
|---|---|---|---|---|---|---|---|---|---|
| | | β-sialon forming composition | | ZrO₂ (calculated on Zr) | | SiC | bending str. | fracture toughness | Hv |
| Samples | | Si₃N₄ | Al₂O₃ | Y₂O₃ solid solution (mole %) | amount | whisker | (kg/mm²) | (MN/m^{3/2}) | (kg/mm²) |
| Invention | 45 | 62.8 | 5.2 | 0 | 11.1 | 20.9 | 94.5 | 7.5 | 1830 |
| | 46 | 63.2 | 5.3 | 3 | 10.5 | 21.0 | 112.0 | 7.5 | 1720 |
| | 47 | 63.7 | 5.3 | 7 | 9.8 | 21.2 | 112.0 | 7.7 | 1675 |

TABLE 5

| | | Mixture Composition (wt %) | | | | | Properties of Sintered Bodies | | |
|---|---|---|---|---|---|---|---|---|---|
| | | β-sialon powders | | ZrO₂ (calculated on Zr) | Y₂O₃ | SiC whisker | bending str. (kg/mm²) | fracture toughness (MN/m^{3/2}) | Hv (kg/mm²) |
| Samples | | z value | amount | | | | | | |
| Invention | 48 | 0.3 | 62.8 | 11.1 | 5.2 | 20.9 | 91.5 | 7.5 | 1680 |
| | 49 | 0.5 | 72.0 | 7.4 | 5.2 | 15.4 | 80.3 | 7.3 | 1630 |
| | 50 | 1.0 | 66.9 | 7.4 | 5.2 | 20.5 | 73.8 | 7.0 | 1690 |
| Comparison | 51 | 2.0 | 77.2 | 7.4 | 5.1 | 10.3 | 43.0 | 4.5 | 1450 |

TABLE 6

| | | Mixture Composition (wt %) | | | | | | | | | Properties of Sintered Bodies | | | |
|---|---|---|---|---|---|---|---|---|---|---|---|---|---|---|
| | | sialon-forming composition | | | | Zr-compounds (calculated on Zr) | | | | SiC | bending str. | fracture toughness | Hv (kg/ | impacts until fracture |
| Samples | | Si₃N₄ | Al₂O₃ | AlN | Y₂O₃ | ZrO₂ | ZrN | ZrC | ZrSi₂ | whisker | (kg/mm²) | (MN/m^{3/2}) | mm²) | (times) |
| Inven- | 52 | 59.2 | 4.0 | | 5.0 | 11.8 | | | | 20 | 68.5 | 7.0 | 1600 | 3100 |
| tion | 53 | 56.2 | 4.0 | | 8.0 | 11.8 | | | | 20 | 78.5 | 8.1 | 1550 | 4000 |
| | 54 | 48.2 | 4.0 | 8.0 | 8.0 | 11.8 | | | | 20 | 73.0 | 7.8 | 1500 | 3500 |
| Comparison | 55 | 56.2 | 4.0 | | 8.0 | | 11.8 | | | 20 | 51.0 | 5.0 | 1350 | immediately fractured |
| | 56 | 56.2 | 4.0 | | 8.0 | | | 11.8 | | 20 | 43.0 | 4.5 | 1310 | immediately fractured |
| | 57 | 56.2 | 4.0 | | 8.0 | | | | 11.8 | 20 | 41.5 | 4.5 | 1300 | immediately fractured |

What is claimed is:

1. A composite ceramic material reinforced with silicon carbide whiskers, consisting essentially of: 5 to 45% by weight of SiC whiskers, 3 to 20% by weight of at least one selected from the group consisting of oxides and oxynitrides of zirconium calculated on the zirconium, and the balance being a SiAlON-based ceramic substance, said SiAlON-based ceramic substance consisting essentially of one selected from the group consisting of β-SiAlON represented by the compositional formula Si$_{6-z}$Al$_z$O$_z$N$_{8-z}$ (where 0<z≦1) and an α,β-composite SiAlON made up of said β-SiAlON and an α-SiAlON represented by the compositional formula M$_x$(Si,Al)$_{12}$(O,N)$_{16}$ (where M denotes at least one selected from the group consisting of Li, Ca, Mg, Y and rare earth metals and 0<x≦2); and 1 to 25% by weight of a glass phase containing therein Zr, Si, Al, O and N, or further at least one selected from the group consisting of Y, Mg, Ca and rare earth metals, and wherein a substantial amount of the oxides and/or oxynitrides of zirconium is present at interfaces between the SiC whiskers and the SiAlON-based ceramic substance.

2. A composite ceramic material reinforced with silicon carbide whiskers as set forth in claim 1, wherein said SiC whiskers range from 10 to 30% by weight, and said oxide and/or oxynitride of zirconium range from 7 to 20% by weight calculated on zirconium.

3. A composite ceramic material reinforced with silicon carbide whiskers as set forth in claim 1, wherein said SiC whiskers ranges from 15 to 25% by weight, and said oxides and/or oxynitrides of zirconium range from 7 to 15% by weight calculated on zirconium.

4. A composite ceramic material as set forth in claim 1, wherein said SiALON-based ceramic substance is present at least 55% by weight of the entire material.

5. A composite ceramic material as set forth in claim 1, which has a density relative to the theoretical density of at least 95%.

6. A composite ceramic material as set forth in claim 1, wherein α-SiALON is present in an amount of 5 to 30% by weight of the entire SiALON-based ceramic substance.

7. A composite ceramic material as set forth in claim 1, wherein α-SiALON is 5 to 20% by weight of the entire SiALON-based ceramic substance.

8. A composite ceramic material as set forth in claim 1, wherein the SiC whisker has a diameter of 0.2 to 5 μm and an average length of 5 to 100 μm.

9. A composite ceramic material as set forth in claim 8, wherein the SiC whisker has a diameter of 0.5 to 2 μm and an average length of 5 to 50 μm.

10. A composite ceramic material as set forth in claim 1, wherein $0 < z \leq 0.5$.

11. A composite ceramic material reinforced with silicon carbide whiskers, which has been produced by sintering a starting material mixture consisting essentially of:
   5 to 45% by weight of SiC whiskers, 3 to 20% by weight of zirconia calculated on the zirconium, and the balance being SiAlON-forming components,
   said SiAlON-forming components consisting essentially of $Si_3N_4$ and $Al_2O_3$ in a proportion corresponding to β-SiAlON represented by the compositional formula $Si_{6-z}Al_zO_zN_{8-z}$ (where $0 < z \leq 1$),
   so that in said composite ceramic material at least a substantial amount of the zirconia is present at interfaces between the SiC whiskers and a SiAlON-based ceramic substance produced by said sintering.

12. A composite ceramic material as set forth in claim 11, wherein said SiALON-forming consist essentially of at least one of $SiO_2$ and AlN.

13. A composite ceramic material as set forth in claim 11, wherein said SiAlON-forming components have a composition corresponding to an α,β-composite SiAlON made up of said β-SiAlON and an α-SiAlON represented by the compositional formula $M_x(Si,Al)_{12}(O,N)_{16}$ (where M denotes at least one selected from the group consisting of Li, Ca, Mg, Y and rare earth metals and $0 < x \leq 2$), M being present in oxide form in the SiAlON-forming components.

14. A composite ceramic material as set forth in claim 11, wherein $Si_3N_4$ amounts to 40–90% by weight of the entire mixture.

15. A composite ceramic material as set forth in claim 11, wherein $Al_2O_3$ amounts to 0.5–25% by weight of the entire mixture.

16. A composite ceramic material as set forth in claim 12, wherein $SiO_2$ amounts to no more than 10% by weight of the entire mixture.

17. A composite ceramic material as set forth in claim 12, wherein AlN amounts to no more than 15% by weight of the entire mixture.

18. A composite ceramic material as set forth in claim 11, wherein the SiAlON-forming components consist essentially of at least one glass phase-forming component of no more than 15% by weight, of the entire mixture, selected from the group consisting of oxides of Mg, Ca, Y and rare earth metals.

19. A composite ceramic material as set forth in claim 11, wherein said SiC whiskers range from 10 to 30% by weight, and the zirconia range from 7 to 20% by weight calculated on zirconium.

20. A composite ceramic material as set forth in claim 11, wherein said whiskers range from 15 to 25% by weight, and the zirconia range from 7 to 15% by weight calculated on zirconium.

21. A composite ceramic material as set forth in claim 11, which has been sintered at a temperature ranging from 1650° to 2000° C.

22. A composite ceramic material as set forth in claim 11, which has been sintered by a press sintering method.

23. A composite ceramic material as set forth in claim 11, which has been sintered in an inert atmosphere atmospheric pressure or under a pressurized gas.

* * * * *